United States Patent [19]
Gerstenhaber

[11] 3,925,779
[45] Dec. 9, 1975

[54] MESSAGE COMMUNICATOR FOR HANDICAPPED PERSONS

[76] Inventor: Suzanne Gerstenhaber, 4100 Greenbriar Drive, Houston, Tex. 77006

[22] Filed: July 10, 1974

[21] Appl. No.: 486,947

[52] U.S. Cl............ 340/337; 340/324 R; 340/365 R
[51] Int. Cl.².................................. G06F 3/14
[58] Field of Search............ 340/324 R, 325, 378 R, 340/379, 336, 343, 365 R, 337

[56] References Cited
UNITED STATES PATENTS

| | | | |
|---|---|---|---|
| 3,347,986 | 10/1967 | Gilbert | 340/365 R |
| 3,560,964 | 2/1971 | Bedell et al. | 340/365 R |
| 3,638,217 | 1/1972 | Sutherland | 340/324 R |
| 3,651,512 | 3/1972 | Summers | 340/325 |
| 3,676,615 | 7/1972 | Wiedmer | 340/365 R |
| 3,818,448 | 6/1974 | Wilkins | 340/325 |
| 3,848,249 | 11/1974 | Meiri | 340/325 |

*Primary Examiner*—Marshall M. Curtis
*Attorney, Agent, or Firm*—Bernard A. Reiter

[57] ABSTRACT

A Message-communicator for persons having speech impairments or obstructions. The handicaps may be of a congenital character or may result from debilitating diseases such as palsy or strokes. The communicator consists of a housing having a keyboard console. A dual surface screen extends upwardly from the console. One screen faces the patient-operator while the other faces the viewer so that the messages which are transmitted by touch of the operator may be received by the viewer while he directly faces the operator.

7 Claims, 3 Drawing Figures

MESSAGE COMMUNICATOR FOR HANDICAPPED PERSONS

BACKGROUND AND DESCRIPTION OF THE INVENTION:

The present invention relates to message-communicators. More particularly the invention relates to a device for enabling communication from mute or aphonic persons to others.

Numerous persons in society suffer from muteness or substantial muteness, this referring to and including persons suffering from either a functional or organic disorder so as to render them aphonic. These people include for example, victims of strokes, palsy or senility or other types of debilitating afflictions which produce a speech impairment. As a result, these persons are unable to normally communicate with others and cannot frequently even communicate their most basic needs or desires. Aside from these persons there is additionally a large group of both children and adults who are characterized by functional speech disorders which severely impair their ability to communicate even their most essential needs.

Numerous solutions to the above problem have been offered and a multitude of devices have been designed to obviate, or even alleviate, this marked handicap. Initially, sign language was conceived and perfected for the utilization of mute persons and although the functional utilization of sign language has reached a sophisticated level it is practiced by relatively few. Sign language severely restricts the ability of a mute person to communicate because of the limited number of persons able to understand such communications. Moreover, in the case of stroke victims or the like, there is a substantial inability even to utilize one's hands and sign language is no ready solution at all.

Various devices have also been conceived and which may be used by mute persons such as stroke patients for the purported purpose of communicating their basic needs. These devices most commonly have been adapted from the principal function of a learning apparatus and are generally characterized by their complexity in construction and in operation. Reference may be made for example to U.S. Pat. Nos. 3,798,793 and 3,654,706. In addition to being unduly complex and expensive, these devices are basically incapable of accomplishing the principal functional purpose to be described hereinafter; namely that of enabling communication between an aphonic person and another person, the latter being an aid, nurse or similar type of attendant.

Of particular importance in the objectives hereof is the stroke victim. This person is incapable frequently not only of verbal expression but also cannot accomplish hand signals or similar motion in order to express his needs and desires. Commonly such patients are initially capable of no physical movement. However, after initial periods of therapy and practice, these patients commonly are able to exhibit minimal finger movement at least and with this fairly common accomplishment in mind there has been conceived and designed the invention disclosed herein. This device is designed to optimize the minimal physical characteristic exhibited by aphonic persons, namely that of the finger expressions of the stroke victim. The device of the invention optimizes this nominal physical expression and produces from it in a remarkably simple manner the ability to communicate basic needs and desires to others. Such other persons take the form of nurses, aids, or assistants, or friends or relatives nearby who attend to and assist these aphonic individuals. Also of importance is the fact that the device herein constitutes, in some measure, a modification of existing electromechanical technology that is practiced today in the form of the mass manufacturing and marketing of the conventional electromechanical number calculator. The device of the invention is therefore not only relatively simple and as easy to manufacture as the number calculator itself but is concomitantly inexpensive and readily available to all who need it. More importantly is the fact that the device is extremely simple to operate and can be mastered even by minor children near the age of 3 after a brief teaching term involving sensory and response stimulation. The device further is capable of more complex modifications, also disclosed herein, which may be incorporated in order to expand and broaden the scope of communication for persons capable of such broader utilization. These modifications, in the form of slide-in printed circuit cards, are well within the scope of the state of the art and impart to the invention an extended capability for patient communication to others. These and numerous other features and advantages of the invention will become more readily apparent upon a reading of the following detailed description, claims and drawings, wherein like numerals denote like parts in the several views and wherein:

Figure 1:
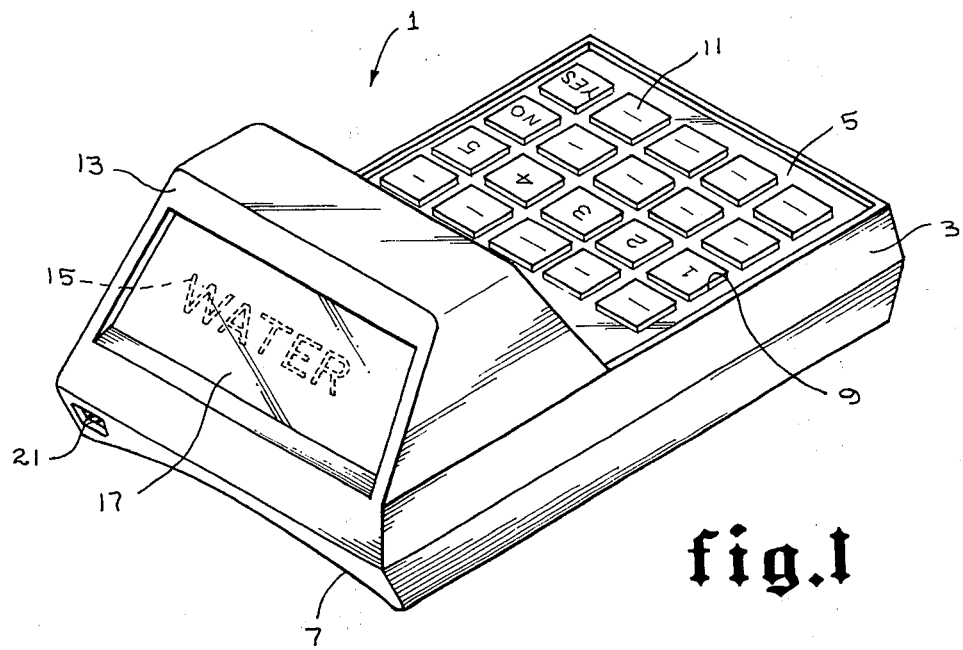
FIG. 1 illustrates a preferred embodiment of the invention showing same in rather simple form.

DETAILED DESCRIPTION OF THE INVENTION:

With reference now to FIG. 1 there is shown, in exemplary form, the messsage-communicator 1. The communicator comprises a basic housing 3 which is characterized by an upper keyboard panel 5 and a bottom surface 7. The keyboard panel 5 has a multiplicity of apertures 9 for receiving coded message keys 11. The coded message keys 11 extend upwardly through the apertures so as to protrude somewhat above the upper surface of keyboard panel 5 thereby accentuating their relative position with respect to one another and thus facilitating their respective identification by a user. The keyboard panel 5 may contain any reasonable number of apertures for receiving the coded message keys, this depending upon the number of messages which the communicator 1 is intended to provide for the user. Although the communicator 1 of FIG. 1 shows the presence of 20 message keys 11 it will be recognized that either more or less may be provided in any given communicator depending upon the ability of the user to assimilate and operate the device. The particular codes or messages which may be represented by the keys 11 will be described hereinafter.

The communicator housing 3 may be adapted to rest upon a lap of a patient or other user. For this purpose, its bottom surface 7 may define a curved recess 11 so as to impart stability to its position. The housing 3 is further characterized by a screen support frame 13 disposed at one end thereof and extending substantially vertically upwardly. The screen support frame constitutes an integral part of the housing and is adapted to receive illuminated indicia means therein of the type generally contained in conventional hand-type calculators. The illuminated indicia means 15 is operatively connected by electrical circuitry to respective keys 11 so that upon depression of any particular key a specific message is caused to appear. The message which appears however is readily visable on both of a pair of screens supported within the screen frame 13. This pair of screens consists of the message receiver screen 17 and the message sender screen 19. The message receiver screen is viewed by an aide, attendant, or other person who is capable of responding to the message actuated by the patient or other user. The message sender screen 19 is, of course, easily viewed by the user since it appears in line-of-sight relation from the user to the other person. The indicia 15 which appears on screen 17 is in reverse relation to the identical indicia which appears on screen 19, that is the message reads from left to right on screens 17 and 19, both with respect to the persons facing each screen. It is thus evident that the indicia means 15 is constructed twice within screen frame 13. Each indicia means may be separated from one another by an opaque panel (not shown) so as to preclude light reflections to the other. The indicia means 15 may consist of any of a number state-of-the-art electromechanisms such as is used in present day hand calculators and may, for example, consist of light-emitting diodes or a liquid crystal display system.

The communicator 1 may be further characterized by an electric plug outlet 21 for providing AC-DC power thereto. Preferably and alternatively, the communicator 1 may be powered by batteries with a rechargable adapter. In any event the communicator 1 is relatively small and of portable character so as to readily rest upon the lap of the user. Its weight range is similar to that of a conventional calculator and is generally visualized in the same size range. The keys 11 on the panel 5 should be of relatively large size so as to be easily actuated by the user with minimal chance of mistake. The keys may be coded in any chosen manner to express the desires of the user. Such coding may take the form of a direct key-to-word translation such as is illustrated in FIG. 1. There, a given key would simply have the word "water" printed thereon and depression of such key would of course produce a visual representation of "water" on the screen. The communicator would be constructed to contain a word or phrase expression to be electrically connected to its respective key. These words and expressions would convey the basic needs and desires of the user to the person assisting. It will be readily recognized that numerous words or expressions could be constructed in any given communicator by merely changing the form of the liquid crystal display or other indicia means 15. The number of keys present on the keyboard panel 5 would in large measure be influenced by the relative size of the communicator 1, the size of the keys themselves, the relative ability of the user to assimilate operation of an increased number of keys and the relative need to utilize a large number of messages or impressions on the screens 17, 19. Should it be desirable to substantially enlarge the number of messages or expressions available for display on the screens so as to increase the scope of message capability emanating from the aphonic user, the communicator 1 of FIG. 1 may be modified in accordance with the design of FIG. 2.

Figure 2:
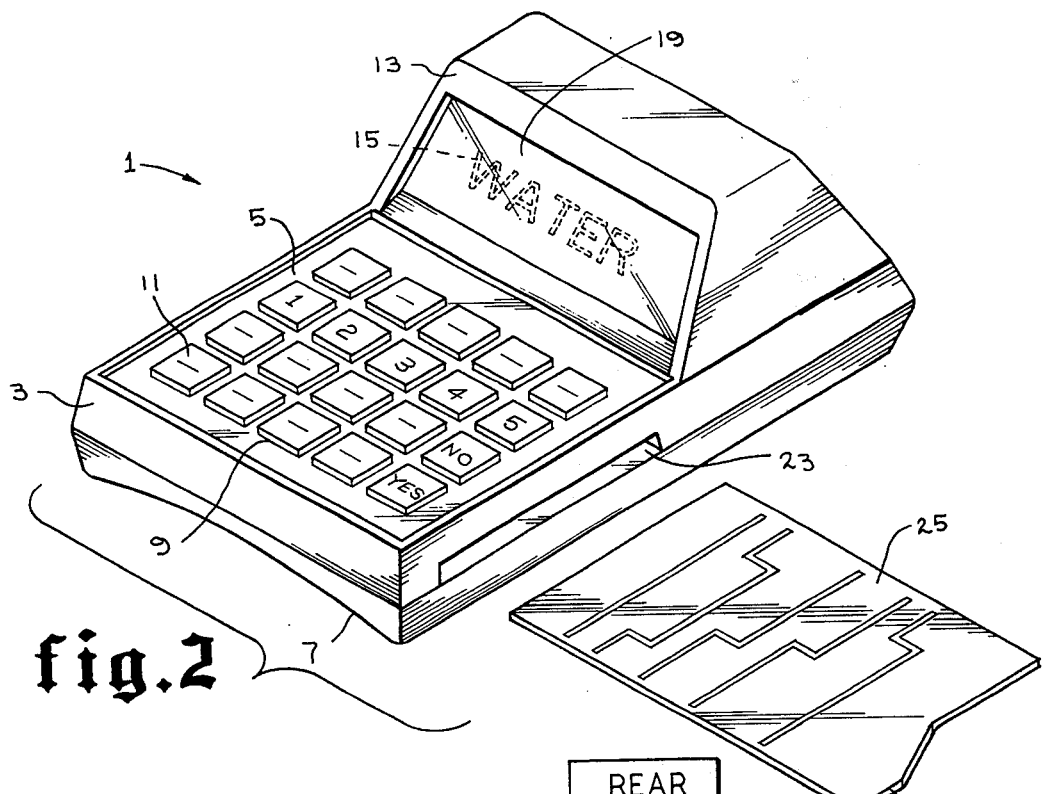
FIG. 2 is a more complex embodiment of the invention showing the expanded communication capability imparted by the removable, slip-in printed circuit board.
Figure 3:
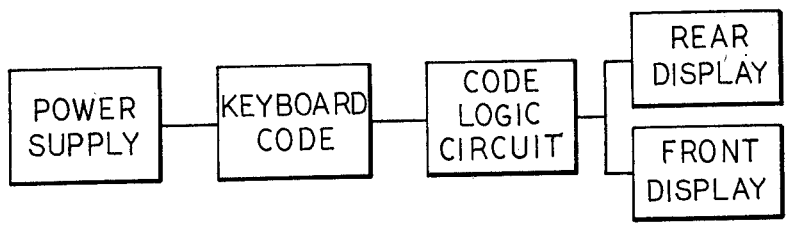
FIG. 3 is a schematic illustration of the circuitry for the communicator.

In FIG. 2 there is shown a communicator 1 similar in design to that of the preferred embodiment in that it consists of a housing 3', keyboard panel 5', message keys 11', and other principal components. Here the housing 3', is characterized by a recessed shelf 23' in a side wall of housing 3'. The recessed shelf 23' is adapted to receive any of a number of printed circuit panels 25' therein. The printed circuit panels 25' are variably designed to produce respective displays of indicia on the screens upon actuation of a key 11'. The panels may be coded by letter, number of color to represent an entire series of a family of expressions. For example a printed circuit panel designated "A" may be an entertainment panel wherein each of the keys 11' contacts, upon depression, a different circuit in the panel to express a different desire of the entertainment language. Thus depression of one button would produce a display of indicia such as "magazine, please", or "television, please", or "turn on radio". Another printed circuit panel could, for example, be coded to represent food and drink expression such as "sandwich, please", or "soup". Thus the user would be capable of expressing relatively detailed desires and needs. One of the keys 11' would be designed to actuate a "change panel" indicia display on the screen so that the user could express this particular request. Other keys 11' would be electrically coupled so as to express designated basic answers such as "yes" and "no" and the like. The printer circuit panel 25' is adapted to be inserted into recessed shelf 23' and to be biased therein in manner analagous to a tape cassette. The panel is characterized by an end protuberance 27' which extends beyond the side of housing 3' when it is in operative position. The end protuberance 27' is adapted to be gripped in order to enable easy removal of the panel and insertion of a different panel.

As indicated hereinabove the mechanical design of the communicator 1 utilizes state of the art technology, this technology being most commonly evidenced in the hand-type calculator, commonly available on the commercial market. The present device is similar to such calculators in regard to its utilization of an optional power supply and key-screen circuitry is concerned. The communicator may embody alternative keyboard codes which include, but are not limited to, alpha-numeric, various symbols, phrases and combination symbols and words. The indicia means 15 appearing on screens 17, 19 may take the form of various logic presentations also, this appearing as a direct symbol representation identical to that of the key or a direct word representation identical to that of the key or any combination or conversion of these or other logic. In deference to symbol or message representation on the screens the message keys 11 may be coded with letters similar to a typewriter keyboard so that an expanded form of message capability may be accomplished. In such design the keyboard may include punctuation keys and other message enhancing indicia.

It will be visualized that utilization of the communicator 1 described herein will enable aphonic persons to not only express their personal desires and needs with a marked facility not presently available, but may also enable such persons to carry on conversations, of varying degrees, with one another or with others. The communicator may thus be utilized by all aphonic persons or others having speech impediments so long as sufficient motor skill exists to actuate the keys 11 described hereinabove. In order to further facilitate ease of operation and visual observation of the keyboard panel 5, the latter may be slanted upwardly for the benefit of the user. These and other similar optional features may be adapted to inclusion in the design of the communicator without departing from the spirit of the invention and from the scope of the claims which are apended hereto.

Therefore that which is claimed and desired to be secured by United States Letters Patent is:

1. The device for enhancing communication from a person having a speech impairment to another comprising:

a portable housing having a bottom surface and an upper surface, the bottom surface being adapted to rest on the lap of the user during operation, the upper surface being characterized by a keyboard panel, a plurality of message keys disposed in said message panel in visually exposed position to the user, each said message key being coded on the surface thereof to correspond to a message transmission, a screen means integrally affixed to the housing proximate an end thereof, said screen means extending substantially vertically upwardly and including a message receiver screen and a message sender screen mounted in back-to-back relation to one another, the message sender screen being visually accessable to the user and the message receiver screen being visually accessable to another person so that a message may be readily transmitted from the sender to such other person, multiple pair of indicia display means, one indicia display means of each pair being mounted in each screen, and, an electronic circuit means and power means therefore, said electronic circuit means disposed in said housing and operably connected to each said respective message keys and to said multiple pair of indicia display means so that pressure applied by the user to any of said keys produces a duplicate visual message on both said screens, thereby providing communication from the user to the receiver.

2. The device of claim 1 wherein the dual screens are disposed in axial alignment with one another and with the line of sight of the viewer so that visual line-of-sight use is inherent between the user, the device and the viewer.

3. A message communicator for enabling improved message transmission from an aphonic-like person to another by the application of slight pressure to one of a plurality keys, the improvement comprising;

a small portable housing adapted to rest on the lap of the aphonic-like user or in adjacent relation thereto, the housing being characterized by a first end proximate the user and a second end remote therefrom, a screen means integrally connected to the housing and extending substantially vertically upwardly therefrom, said screen means including a first screen facing the first end and a second screen facing the opposite direction, each said screens containing a plurality of language display means which are adapted to be illuminated, said language display means consisting of a plurality of identical messages predisposed behind each respective screen, a plurality of message key means on the housing between the said first end and said screen means adapted to illuminate each of a pair of respective identical messages on said screens, circuit means in said housing electrically connected to said key means and language display means, and power means operably connected to said circuit means for illuminating said language display means.

4. The device of claim 3 wherein said housing is characterized by a bottom surface which is of concave configuration so as to improve the stability of the device when in use.

5. A message transmitting device for enhancing communication from a speech impaired user to message receiving person comprising, a portable housing being characterized by a first end proximate the user and a second end remote therefrom, a screen means integrally connected to the housing and extending substantially vertically upwarding therefrom, said screen means including a first screen facing the first end and a second screen facing away therefrom, each said screens containing a plurality of language displays adapted to be energized upon operation of a message key means, the said housing further characterized by a keyboard panel on an upper surface thereof, message keys on said keyboard panel, each said message key carrying a legend on the exposed surface thereof corresponding to one of said respective language displays in both said first and second screens, power means operatively connected to the language display, a recess means in said housing for receiving one of a plurality of circuit boards, and, a circuit board means removably received in said recess for electrically connecting each of said message keys to respective pairs of language displays simultaneously in said first and second screens so that actuation of one of said message keys produces an identical illuminated message on both said screens.

6. The device of claim 5 wherein said plurality of language displays are constructed of light emitting diodes.

7. The device of claim 5 wherein said plurality of language displays are constructed of liquid crystal.

* * * * *